United States Patent
Hwang et al.

(10) Patent No.: US 8,199,693 B2
(45) Date of Patent: Jun. 12, 2012

(54) METHOD AND APPARATUS FOR CONTROLLING POWER IN A DECODE-AND-FORWARD RELAY SYSTEM

(75) Inventors: Duck Dong Hwang, Yongin-si (KR); Eung Sun Kim, Suwon-si (KR); Young-Doo Kim, Suwon-si (KR); Chang Wook Ahn, Gwangju (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1047 days.

(21) Appl. No.: 11/859,925

(22) Filed: Sep. 24, 2007

(65) Prior Publication Data

US 2008/0170512 A1 Jul. 17, 2008

(30) Foreign Application Priority Data

Jan. 12, 2007 (KR) .................. 10-2007-0004009

(51) Int. Cl.
- H04B 7/185 (2006.01)
- H04B 7/00 (2006.01)
- H04B 1/38 (2006.01)
- H01Q 11/12 (2006.01)

(52) U.S. Cl. ............... 370/318; 455/127.5; 455/522; 455/574

(58) Field of Classification Search .............. 370/315, 370/318; 455/522, 574, 127.1, 127.5
See application file for complete search history.

(56) References Cited

U.S. PATENT DOCUMENTS

| | | | | |
|---|---|---|---|---|
| 4,835,494 | A * | 5/1989 | Preschutti | 333/16 |
| 2001/0055966 | A1* | 12/2001 | Hanly | 455/422 |
| 2003/0012168 | A1 | 1/2003 | Elson et al. | |
| 2003/0130003 | A1* | 7/2003 | Won | 455/522 |
| 2006/0056338 | A1* | 3/2006 | Abe et al. | 370/328 |
| 2007/0054642 | A1* | 3/2007 | Bhardwaj et al. | 455/234.1 |
| 2007/0133708 | A1 | 6/2007 | Lee et al. | |
| 2007/0165581 | A1* | 7/2007 | Mehta et al. | 370/338 |
| 2008/0095222 | A1* | 4/2008 | VanLaningham et al. | 375/227 |

FOREIGN PATENT DOCUMENTS

| | | |
|---|---|---|
| KR | 1020050071823 A | 7/2005 |
| KR | 10-2005-0098203 A | 10/2005 |
| KR | 10-2005-0108533 A | 11/2005 |
| KR | 100705448 B1 | 4/2007 |
| KR | 1020070062635 A | 6/2007 |
| WO | 2006/038163 A1 | 4/2006 |

* cited by examiner

Primary Examiner — Ronald Abelson (74) Attorney, Agent, or Firm — Sughrue Mion, PLLC

(57) ABSTRACT

A method and apparatus for controlling power in a decode-and-forward (DF) relay system is provided. The method of controlling power in a DF relay system includes: acquiring first channel information of a first link between a source node and a destination node, second channel information of a second link between the source node and a relay node, and third channel information of a third link between the relay node and the destination node, by using a pilot signal; determining a power level of the source node from the acquired first through third channel information; and feeding back the determined power level to the source node and the relay node.

18 Claims, 4 Drawing Sheets

METHOD AND APPARATUS FOR CONTROLLING POWER IN A DECODE-AND-FORWARD RELAY SYSTEM

CROSS-REFERENCE TO RELATED APPLICATION

This application claims priority from Korean Patent Application No. 10-2007-0004009, filed on Jan. 12, 2007, in the Korean Intellectual Property Office, the entire disclosure of which is incorporated herein by reference.

BACKGROUND OF THE INVENTION

1. Field of the Invention

Methods and apparatuses consistent with the present invention relate to a relay system. More particularly, the present invention relates to a method and apparatus for controlling power in a decode-and-forward (DF) relay system.

2. Description of Related Art

A relay system may acquire a diversity gain through a cooperation between network nodes by using a relay scheme. The relay scheme includes an amplify-and-forward (AF) protocol and a decode-and-forward (DF) protocol. In the AF protocol, a relay amplifies a received signal to retransmit the received signal. Conversely, in the DF protocol, the relay completely decodes the received signal and then re-encodes the decoded received signal and thereby transmits the encoded received signal.

Accordingly, in the case of an AF relay scheme, since a relay retransmits a received signal without decoding the received signal, noised contained in the received signal is also amplified during a retransmission process. Also, in the case of a DF relay scheme, when an error occurs during a decoding process, an error propagation occurs even in a signal to be encoded and then transmitted. A cooperative diversity technology utilizes the AF relay scheme, the DF relay scheme, and the like. Also, the cooperative diversity technology can provide a high data transmission rate, an improved service quality, and an excellent network capacity in various wireless networks, such as a limited frequency spectrum, complex space-time, and the like, and thus the cooperative diversity technology is gaining popularity.

In this instance, specific research related to a relay system using the cooperative diversity technology is being currently performed. Particularly, technologies and experimental data are insufficient in association with communications of the relay system using the DF relay scheme.

In a conventional method and apparatus for controlling power in a DF relay system, since a power of a signal at a source node or a relay node is maintained to a uniform level, link reliability and throughput may be reduced.

Also, since the power is uniformly maintained at all times, the efficiency of the power may be reduced. Particularly, in the DF relay scheme, the above-described problems become an issue.

Therefore, a method and apparatus for controlling power in a DF relay system is required.

SUMMARY OF THE INVENTION

An aspect of the present invention provides a method and apparatus for controlling power in a decode-and-forward (DF) relay system, which can accurately determine channel information of a current DF relay system and thereby can control the power according to each of the channel information.

According to an aspect of the present invention, there is provided a method of controlling power in a DF relay system, the method including: acquiring first channel information of a first link between a source node and a destination node, second channel information of a second link between the source node and a relay node, and third channel information of a third link between the relay node and the destination node, by using a pilot signal; identifying a particular quantization region including the channel information from the acquired first through third channel information; and determining information of a transmit signal power corresponding to the particular quantization region. In this instance, the particular quantization region may be classified by grouping the first through third channel information into an integer group according to a predetermined criterion.

According to another aspect of the present invention, there is provided a method of controlling power in a DF relay system, the method including: extracting long term variance information of a first link between a source node and a destination node, long term variance information of a second link between the source node and a relay node, and long term variance information of a third link between the relay node and the destination node, when feedback information is absent; calculating a transmit signal power of the source node using the extracted long term variance information; and transmitting a signal at the calculated transmit signal power.

According to still another aspect of the present invention, there is provided a method of controlling power in a DF relay system, the method including: in the case of an infinite feedback case, acquiring first channel information of a first link between a source node and a destination node, second channel information of a second link between the source node and a relay node, and third channel information of a third link between the relay node and the destination node, by using a pilot signal; calculating an optimal transmit signal power by using the acquired first through third channel information; and transmitting the calculated information of the transmit signal power from the destination node to any one of the source node and the relay node.

According to yet another aspect of the present invention, there is provided an apparatus for controlling power in a DF relay system, the apparatus including: an acquirement unit which acquires first channel information of a first link between a source node and a destination node, second channel information of a second link between the source node and a relay node, and third channel information of a third link between the relay node and the destination node, by using a pilot signal; an identifier which identifies a particular quantization region including the channel information from the acquired first through third channel information; and a determination unit which determines information of a transmit signal power corresponding to the particular quantization region. In this instance, the particular quantization region may be classified by grouping the first through third channel information into an integer group according to a predetermined criterion.

According to another aspect of the present invention, there is provided an apparatus for controlling power in a decode-and-forward relay system, the apparatus including: in the case of an infinite feedback case, an extractor which extracts long term variance information of a first link between a source node and a destination node, long term variance information of a second link between the source node and a relay node, and long term variance information of a third link between the relay node and the destination node when feedback information is absent; a calculator which calculates a transmit signal power of the source node by using the extracted long term variance information; and a transmitter which transmits a signal at the calculated transmit signal power.

According to another aspect of the present invention, there is provided an apparatus for controlling power in a decode-and-forward relay system, the apparatus including: an acquirement unit which acquires first channel information of a first link between a source node and a destination node, second channel information of a second link between the source node and a relay node, and third channel information of a third link between the relay node and the destination node, by using a pilot signal; a calculator which calculates an optimal transmit signal power using the acquired first through third channel information; and a transmitter which transmits the calculated information of the transmit signal power from the destination node to any one of the source node and the relay node.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 1:
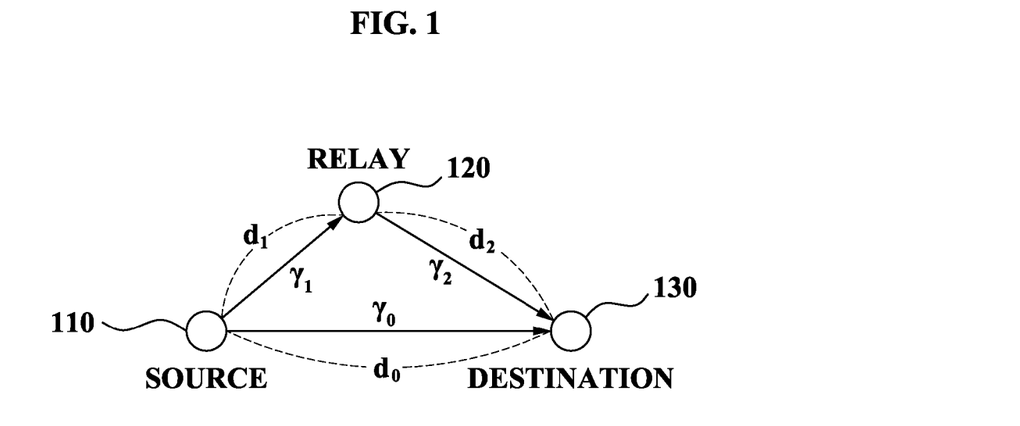
FIG. 1 illustrates a DF relay system including a source node, a destination node, and a relay according to an exemplary embodiment of the present invention.

FIG. 1 illustrates a decode-and-forward (DF) relay system including a source node 110, a destination node 130, and a relay node 120 according to an exemplary embodiment of the present invention. Hereinafter, a signal model of the DF relay system, a channel gain between nodes, and the like, according to an exemplary embodiment of the present invention will be described with reference to FIG. 1.

As shown in FIG. 1, the DF relay system according to the present exemplary embodiment includes the source node 110, the relay node 120, and the destination node 130. In a DF protocol, the source node 110 transmits mutual information to the destination node 130 at power $P_s$ during a first time slot. In this instance, the term DF protocol may be utilized herein as a concept corresponding to the above-described DF relay scheme. The relay node 120 overhears the transmission of the source node 110. When the mutual information is successfully decoded in the relay node 120, the relay node 120 transmits the mutual information at power $P_r$ during a second time slot. The destination node 130 receives the mutual information from the source node 110 and the relay node 120.

When a distance between the source node 110 and the destination node 130 is $d_0$, a distance between the source node 110 and the relay node 120 is $d_1$, and a distance between the relay node 120 and the destination node 130 is $d_2$, a corresponding channel gain may be represented as, $$E[\gamma_i]=1/d_i^2 (i=0,1,2) \quad \text{[Equation 1]}$$

where the power of additive noise at the relay node 120 and the destination node 130 are assumed to be 1.

Specifically, a transmit signal power controlling scheme according to an exemplary embodiment of the present invention suggests a technology capable of controlling power with a different method, depending upon whether feedback information is infinite, finite, or absent. The transmit signal power controlling scheme reduces an outage probability. The outage probability is determined based on mutual information which follows, $$I_{DF} = \begin{cases} \frac{1}{2}\log(1+\gamma_0 P_s), & \text{if } \gamma_0 \geq \gamma_1 \\ \frac{1}{2}\log[1+\min(\gamma_1 P_s, \gamma_0 P_s + \gamma_2 P_r)], & \text{otherwise} \end{cases} \quad \text{[Equation 2]}$$

The destination node 130 calculates the range of a transmit signal power, for each feedback status, in which a communication is enabled with avoiding an outage status or at least reducing the outage status. As described above, according to the present invention, power efficiency, link reliability, and throughput may be improved. A method of calculating the range of a transmit signal power will be described in detail with reference to FIGS. 2 through 5. Hereinafter, feedback statuses of channel status information (CSI) according to the present invention will be described.

First Embodiment

Infinite Feedback Status

Figure 2:
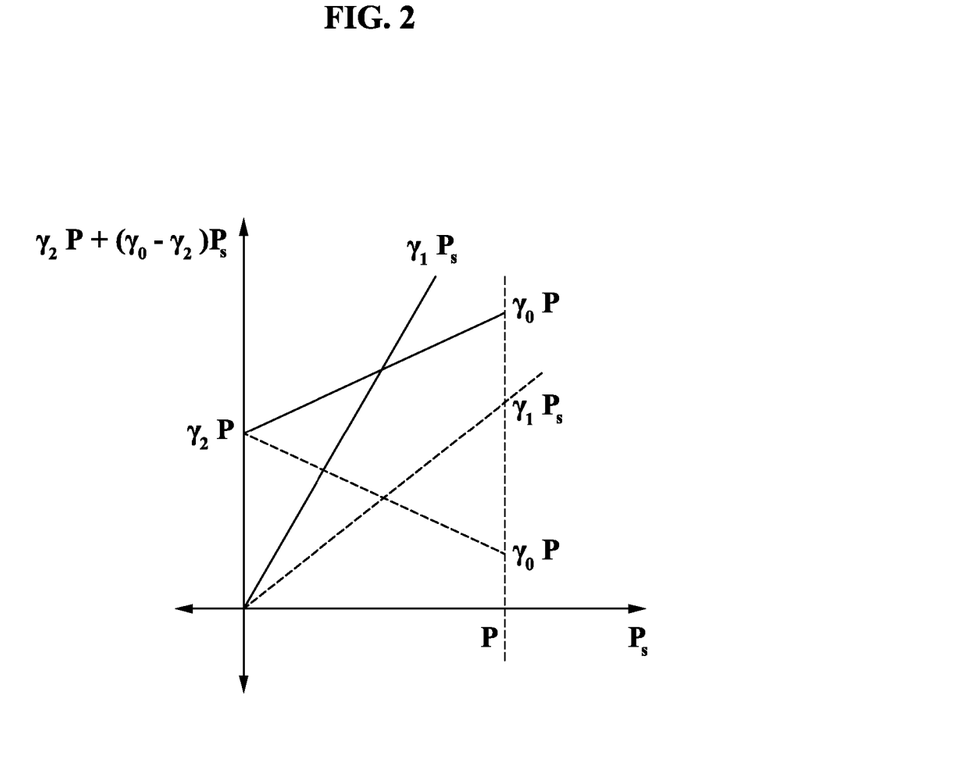
FIG. 2 illustrates a graph of a transmit signal power having $P_S$ and $\gamma_2 P + (\gamma_0 - \gamma_2) P_S$ for x and y axes respectively in an infinite feedback status according to an exemplary embodiment of the present invention.

FIG. 2 illustrates a graph of a transmit signal power having $P_S$ and $\gamma_2 P + (\gamma_0 - \gamma_2) P_S$ for x and y axes respectively in an infinite feedback status according to an exemplary embodiment of the present invention. Hereinafter, a method of calculating the range of an optimal transmit signal power at a source node in the infinite feedback status will be described with reference to FIG. 2.

Referring back to FIG. 1, a DF protocol, when a channel gain connecting a source node 110 and a relay node 120 is greater than another channel gain connecting a source node 110 and a destination node 130, i.e. $\gamma_1 > \gamma_0$, the relay scheme helps the source transmission. Otherwise, the source node 110 transmits a signal to the destination node 130 without using the relay scheme. In this case, total mutual information indicates a minimum value between mutual information to a link from the source node 110 to the relay node 120, and mutual information to a link from the relay node 120 to the destination node 130 of the source node 110.

When total power P is an addition of $P_S$ and $P_r$, i.e. $P=P_S+P_r$, a later argument of the minimum operator satisfies, $$\gamma_0 P_s = \gamma_2 P_r = \gamma_2 P + (\gamma_0 - \gamma_2) P_s \quad \text{[Equation 3]}$$

where $P_S \leq P$.

For easy understanding, as shown in FIG. 2, when $\gamma_2 > \gamma_0$, $\gamma_2 P + (\gamma_0 - \gamma_2) P_S$ and $\gamma_1 P_S$ are indicated by dotted lines. Also, when $\gamma_2 \leq \gamma_0$, $\gamma_2 P + (\gamma_0 - \gamma_2) P_S$ and $\gamma_1 P_S$ are indicated by solid lines. Since $\gamma_1 > \gamma_0$ in the second case of Equation 2, $\gamma_2 P + (\gamma_0 - \gamma_2) P_S$ and $\gamma_1 P_S$ intersect regardless of a sign of $\gamma_2 - \gamma_0$.

An outage used in the present specification may indicate an event where mutual information is reduced to less than a particular rate R. According to the present invention, the occurrence of the outage may be reduced.

Also, when $\gamma = [\gamma_0 \gamma_1 \gamma_2]$, $P_{st}$ corresponding to an instantaneous power is an addition of $P_s$ and $P_r$, R is given by, $$R = \max_{P_s P_r} I_{DF}(\gamma, P_s, P_r) \quad \text{[Equation 4]}$$

where $P_s + P_r = P_{st}$.

Also, when $\gamma_2 \leq \gamma_0$, a maximum value of $\min(\gamma_1 P_S, \gamma_0 P_S + \gamma_2 P_r)$ is acquired when $P_S = P$ since both lines increase as $P_S$ increases. Otherwise, the maximum value of $\min(\gamma_1 P_S, \gamma_0 P_S + \gamma_2 P_r)$ is acquired when both lines intersect. Specifically, when $\gamma_2 > \gamma_0$, a maximum mutual information value is given by, $$\frac{1}{2}\log\left(1 + \frac{\gamma_1 \gamma_2}{\gamma_1 + \gamma_2 - \gamma_0} P_{st}\right) \quad \text{[Equation 5]}$$

In this instance, Equation 5 is acquired when $$P_s = \frac{\gamma_2 P_{st}}{\gamma_1 + \gamma_2 - \gamma_0}.$$

Accordingly, it can be known that $P_S$ indicates an optimal transmit signal power which is acquired when feedback information is infinite, which is an ideal status.

Specifically, when the destination node 130 transmits infinite feedback information, the destination node 130 acquires first channel information of a first link between the source node 110 and the destination node 130, second channel information of a second link between the source node 110 and the relay node 120, and third channel information of a third link between the relay node 120 and the destination node 130, by using a pilot signal. For example, since a channel gain may be utilized for channel information, the first channel information may be represented as $\gamma_0$, the second channel information as $\gamma_1$, and the third channel information as $\gamma_2$.

In this instance, the destination node 130 may calculate the optimal transmit signal power $P_s$ by $$P_s = \frac{\gamma_2 P_{st}}{\gamma_1 + \gamma_2 - \gamma_0}.$$

The destination node 130 transmits information about the calculated transmit signal power $P_s$ to any one of the source node 110 and the relay node 120. Accordingly, the source node 110 or the relay node 120 transmits a signal at a power corresponding to the transmitted information.

Second Embodiment

Finite Feedback Status

Figure 3:
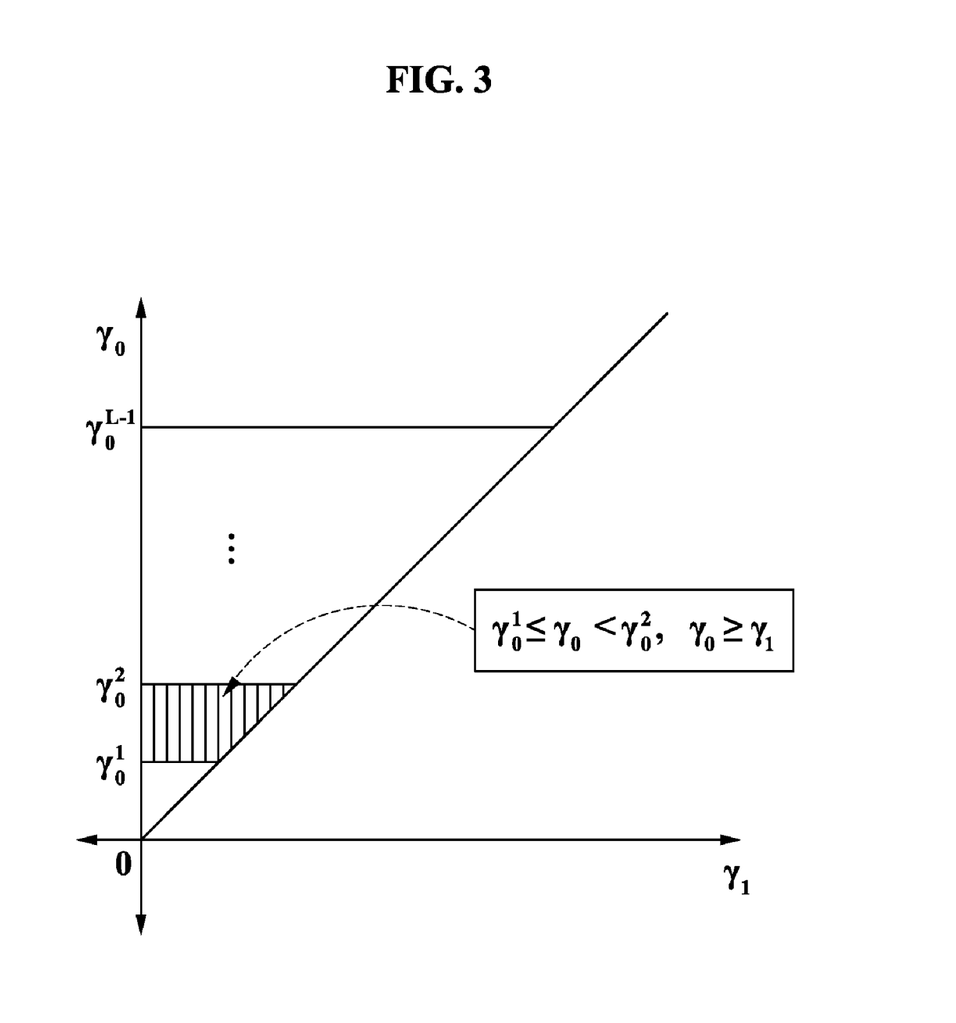
FIG. 3 illustrates a graph of a quantization region having $\gamma_1$ and $\gamma_0$ for x and y axes respectively in a finite feedback status according to an exemplary embodiment of the present invention.
Figure 4:
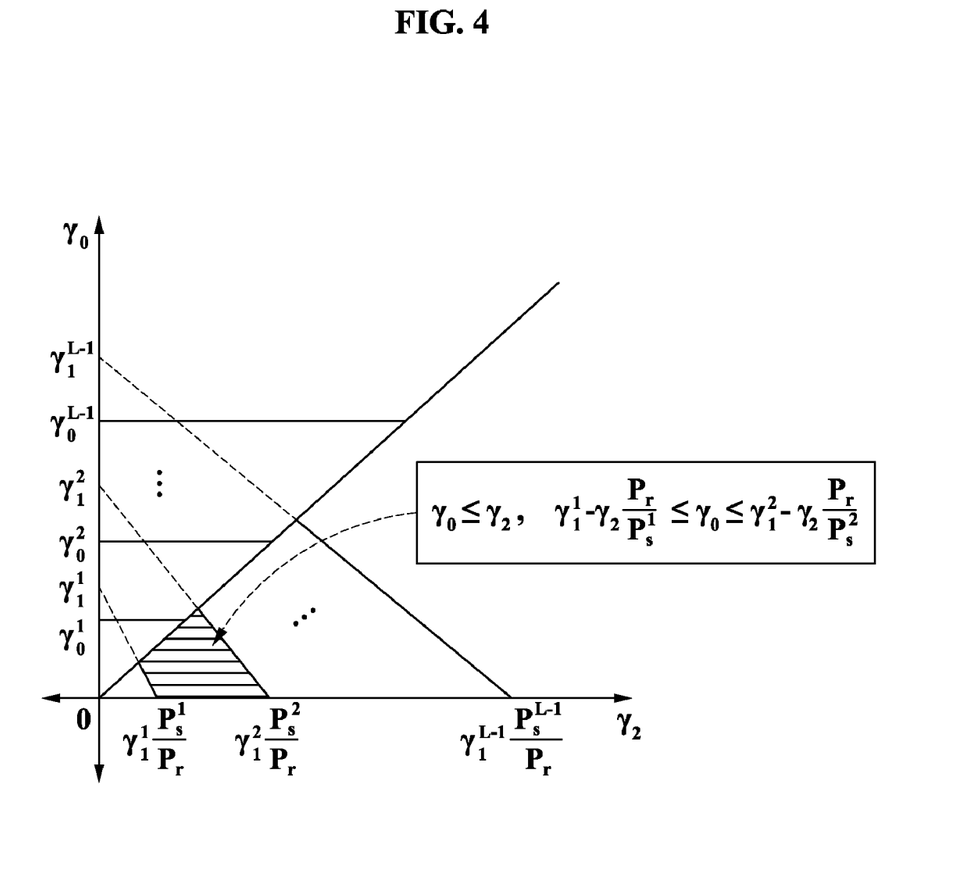
FIG. 4 illustrates a graph of a quantization region having $\gamma_2$ and $\gamma_0$ for x and y axes respectively in a finite feedback status according to an exemplary embodiment of the present invention.

FIG. 3 illustrates a graph of a quantization region having $\gamma_1$ and $\gamma_0$ for x and y axes respectively in a finite feedback status according to an exemplary embodiment of the present invention, and FIG. 4 illustrates a graph of a quantization region having $\gamma_2$ and $\gamma_0$ for x and y axes respectively in a finite feedback status according to an exemplary embodiment of the present invention. Hereinafter, a method of calculating the range of an optimal transmit signal power at a source node in the finite status will be described with reference to FIGS. 3 and 4.

Information about $\gamma_0$, $\gamma_1$, and $\gamma_2$ may be acquired by using a pilot signal.

Referring to FIG. 3, y axis is quantized with a predetermined number of integers. In this instance, when $\gamma_0 > \gamma_1$, the relay node 120 is not required. Conversely, when $\gamma_0 < \gamma_1$, a signal is transmitted via the relay node 120.

By considering the above-described factor, a shaded region shown in FIG. 4 is iteratively quantized. Different power is allocated to each quantized region by calculating $P_s^i$ with respect to each of the quantized regions. In this instance, a method of calculating $P_s^i$ will be described with reference to Equation 6 below. However, it is only an example, and thus the present invention is not limited thereto. Specifically, it will be apparent to those of ordinary skills in the art that a partial correction or substitution with respect to coefficients or variables of Equation 6 may be made without departing from the present invention.

The finite feedback status includes a fixed $P_r$ case and a proportional distribution case, i.e. $P_r = \mu P_s$. Both cases may be treated similarly and thus only the former fixed $P_r$ case will be described herein. For example, when $\{\gamma_0 \geq \gamma_1\} \cup \{\gamma_0 \geq \gamma_2\}$, it may indicate that one bit feedback information is transmitted in the finite feedback status. Also, it will be apparent to those of ordinary skills in the art that a greater number of bits may be allocated to corresponding feedback information according to a feedback channel.

The region above $\gamma_0 = \gamma_2$ indicates a divided region of a parameter $\gamma_0$ when there is no cooperative diversity. $\gamma_0$ is quantized into $L = 2^M$ regions based on a level of channel strength. The power of the source node 120 in an $i^{th}$ region is represented as, $$P_s^i = 2^{2R}/\gamma_0^{i-1} = K/\gamma_0^{i-1} \quad \text{[Equation 6]}$$

where R indicates a transmission rate.

According to the present exemplary embodiment, an outage status for regions from second to $L^{th}$ regions may be eliminated since $\gamma_0 > \gamma_0^i$ needs less power than $P_s^i$ to reach the data rate R. A power relation in a first region is represented as, $$P_s^1 > P_s^2 \quad \text{[Equation 7]}$$

where $\gamma_0^* < \gamma_0^1$, and $P_s^1 \gamma_0^* = K$.

Also, in Equation 2, when $\gamma_1 P_s \geq \gamma_0 P_s + \gamma_2 P_r$, a minimum operator may be eliminated from $\min(\gamma_1 P_S, \gamma_0 P_s + \gamma_2 P_r)$. Accordingly, an $\gamma_0$, $\gamma_2$ plane may be divided with a set of $\gamma_1^i$'s where $\gamma_1^i > \gamma_1^j$ for $i > j$. Similarly as described above, $\gamma_1^{i-1} P_s^i = K$ may be set for $P_s^i$. Also, when numbering regions from a nearest region to a farthest region, $P_s^1 \gamma_1^* = K$.

As described above, according to the present exemplary embodiment, no outage for the second to $L^{th}$ regions occurs in the finite feedback status, which will be described further in detail below.

Specifically, any point $(\gamma_2, \gamma_0)$ in an $i^{th}$ region is on a line $\gamma_0 = \gamma_1' - \gamma_2 P_r/P_s^{i-1}$ where $\gamma_1^{i-1} < \gamma_1' < \gamma_1^i$. On the line, $P_s = P_s^i \gamma_1^{i-1}/\gamma_1'$ is required to avoid the outage. In this instance, $P_s$ is less than $P_s^i$.

$P/L = P_s^i \int_{R_i} f_\gamma(\gamma) d\gamma$ is iteratively utilized to acquire regions from $L^{th}$ to first regions and a power level in each of the regions. When the power at the relay node 120 is proportional to the power at the source node 110, a parameter space is divided with $\gamma_1 \geq \gamma_0 + \gamma_2 \mu$, and the above-described operations are repeated. In this instance, P indicates a total transmit signal power and $P_s^i$ indicates a power in the $i^{th}$ region among the quantized regions.

Specifically, the power efficiency may be improved by quantizing the region of the graph of FIG. 4, including $\gamma_2$, $\gamma_0$, according to a certain relation, and allocating a different power to each of the quantized region. Also, for example, the method of calculating the different power may utilize $P/L = P_s^i \int_{R_i} f_\gamma(\gamma) d\gamma$. In the conventional art, only the same power is allocated. However, according to the present invention, the different power may be allocated.

Specifically, when the destination node 130 transmits finite feedback information, the destination node 130 acquires first channel information of a first link between the source node 110 and the destination node 130, second channel information of a second link between the source node 110 and the relay node 120, and third channel information of a third link between the relay node 120 and the destination node 130, by using a pilot signal. For example, since a channel gain may be utilized for channel information, the first channel information may be represented as $\gamma_0$, the second channel information as $\gamma_1$, and the third channel information as $\gamma_2$.

In this instance, the destination node 130 determines to which region a current communication status belongs, among the quantized regions shown in FIG. 4, based on the first channel information and the third channel information. When the destination node 130 determines that the current communication status belongs to a particular quantized region, the determination node 130 calls a transmit signal power mapped on each quantized region, and thereby determines an optimal transmit signal power.

Also, when the destination node 130 transmits information about the determined transmit signal power to any one of the source node 110 and the relay node 120, the source node 110 or the relay node 120 may transmit a signal at the transmit signal power.

Third Embodiment

No CSI

The total transmit signal power P corresponds an addition of $P_s$ and $P_r$ i.e. $P = P_s + P_r$. In this instance, $P_s = \kappa P$, $P_r = (1-\kappa)P$, and $\kappa$ has the range between 0 and 1. In a no feedback status, it is most important to acquire an appropriate $\kappa$ to reduce an outage probability. An outage event where the outage status occurs corresponds to a union of, with $\gamma_0 \geq \gamma_1$ or $\gamma_0 \geq \gamma_2$, $\kappa \gamma_0 P \leq K$ and with $\gamma_0 < \gamma_1$ and $\gamma_0 < \gamma_2$, $\gamma_1 = \gamma_0 + \gamma_2(1-\kappa)/\kappa \leq K/P$. Therefore, in the present exemplary embodiment, the optimal transmit signal power is acquired by, $$P_{out} = \int_0^{\gamma_0^*} \int_0^{\gamma_0} f_{\gamma_0,\gamma_1}(\gamma_0, \gamma_1) d\gamma_1 d\gamma_0 + \quad \text{[Equation 8]}$$
$$\int_0^{\gamma_0^*} \int_0^{\gamma_0} f_{\gamma_0,\gamma_2}(\gamma_0, \gamma_2) d\gamma_2 d\gamma_0 -$$
$$P(\gamma_0 \geq \gamma_1, \gamma_0 \geq \gamma_2) + P(\gamma_0 < \gamma_1) +$$
$$\int_0^{\kappa \gamma_1^*} \int_{\gamma_0}^{\beta(\gamma_0)} f_{\gamma_0,\gamma_2}(\gamma_0, \gamma_2 | \gamma_0 < \gamma_1) d\gamma_2 d\gamma_0$$
$$\approx \frac{(\lambda_1 + \lambda_2)(\gamma_0^*)^2}{\lambda_0 \lambda_1 \lambda_2} + \frac{\lambda_1}{\lambda_0 + \lambda_1} \frac{\kappa^2}{1-\kappa} \frac{(\gamma_1^*)^2}{\lambda_0 \lambda_2}$$

where $\beta(x) = (\gamma_1^* - x)\kappa/(1-\kappa)$. In this instance, an approximation value corresponds to a high signal-to-noise ratio (SNR) value. Also, when substituting $\gamma_0^* = K/(\kappa P)$ and $\gamma_1^* = K/P$ for Equation 8 above, optimal $\kappa^*$ is arranged to $$(\lambda_1)^2 \kappa^4(\kappa - 2) + 2(\lambda_0 + \lambda_1)(\lambda_1 + \lambda_2)(1 - \kappa)^2 = 0 \quad \text{[Equation 9]}$$

In Equation 9, it is possible to accurately calculate transmit signal power at which the outage probability can be reduced in a no feedback status by acquiring $\kappa$. In this instance, $\lambda$ indicates a long term variance. More specifically, $\lambda$ may indicate a degree of variance of a signal for each link, according to a predetermined period. As described above, according to the present exemplary embodiment, it is possible to calculate the optimal transmit signal power by using the pre-stored $\lambda$ corresponding to a long term statistical value.

In this instance, $\lambda_0$ may indicate a long term variance of the first link between the source node 110 and the destination node 130, $\lambda_1$ may indicate a long term variance of the second link between the source node 110 and the relay node 120, and $\lambda_2$ may indicate a long term variance of the third link between the relay node 120 and the destination node 130.

The optimal transmit signal power at which the source node 110 or the relay node 130 may transmit may be calculated by acquiring $\kappa$ by substituting $\lambda_0$, $\lambda_1$, and $\lambda_2$ into Equation 9 above, and also substituting $\kappa$ into $P_s = \kappa P$.

Figure 5:
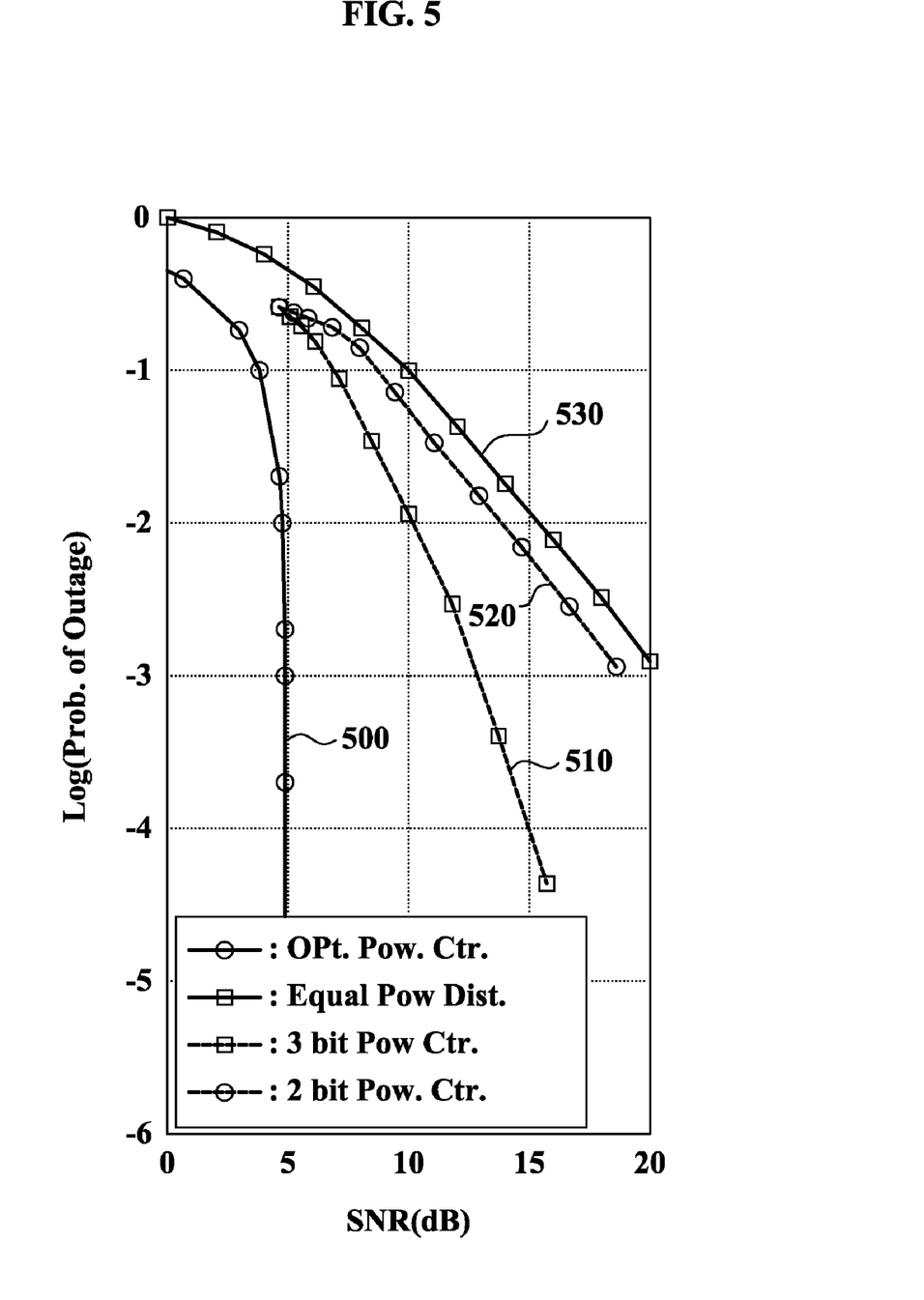
FIG. 5 illustrates a graph in which an outage probability for each status is reduced according to an exemplary embodiment of the present invention.

FIG. 5 is a graph illustrating a reduced outage probability according to each of the first through third embodiments. Hereinafter, an outage probability, which is acquired when controlling power for each particular status, will be described with reference to FIG. 5.

As shown in FIG. 5, a curve 500 of an ideal feedback corresponding to an infinite feedback status is compared with another curve 530 of equal power distribution corresponding to no feedback status. When one-bit feedback information is transmitted, a cooperative diversity may be utilized for signaling cooperation. In FIG. 5, only data in the infinite feedback status 500, finite feedback statuses 510 and 520, and no feedback status 530 are illustrated. It can be seen that the outage probability is significantly reduced in comparison to the conventional art.

As described above, according to the present invention, there is provided a DF relay system which can control power depending upon an amount of feedback information. Therefore, it is possible to improve the power efficiency for each of an infinite feedback status when an amount of feedback information is infinite, a finite feedback status when an amount of feedback information is finite, and no feedback status when an amount of feedback information is zero. Particularly, in the infinite feedback status, communicable regions are quantized and a different power is allocated to each of the quantized regions. Therefore, it is possible to improve the power efficiency and reduce an outage probability.

Also, according to the present invention, there is provided a DF relay system which can improve a link reliability and throughput in a network communication.

Also, according to the present invention, there is provided a DF relay system which can improve the battery efficiency of a source node, such as a mobile phone, and the like, by effectively controlling power.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of controlling power in a decode-and-forward relay system, the method comprising:
    acquiring first channel information of a first link between a source node and a destination node, second channel information of a second link between the source node and a relay node, and third channel information of a third link between the relay node and the destination node, by using a pilot signal;
    identifying a particular quantization region including the channel information from the acquired first through third channel information; and
    determining information of a transmit signal power corresponding to the particular quantization region,
    wherein the particular quantization region is classified by grouping the first through third channel information into an integer group according to a predetermined criterion.

2. The method of claim 1, wherein the first through third channel information correspond to a channel gain of the first through third links, respectively.

3. The method of claim 1, further comprising:
    transmitting the determined information of the transmit signal power from the destination node to any one of the source node and the relay node.

4. A method of controlling power in a decode-and-forward relay system, the method comprising:
    extracting long term variance information of a first link between a source node and a destination node, long term variance information of a second link between the source node and a relay node, and long term variance information of a third link between the relay node and the destination node, when feedback information is absent;
    calculating a transmit signal power of the source node using the extracted long term variance information; and
    transmitting a signal at the calculated transmit signal power.

5. The method of claim 4, wherein the calculating comprises:
    calculating $P_s$ by substituting $\kappa$ for $\kappa$ of $P_s = \kappa P$, $\kappa$ being acquired by $(\lambda_1)^2 \kappa^4 (\kappa - 2) + 2(\lambda_0 + \lambda_1)(\lambda_1 + \lambda_2)(1-\kappa)^2 = 0$,
    where $P_s$ indicates the transmit signal power at the source node, P indicates a total transmit signal power at the source node and the relay node, $\lambda_0$ indicates a long term variance of the first link, $\lambda_1$ indicates a long term variance of the second link, and $\lambda_2$ indicates a long term variance of the third link.

6. The method of claim 4, wherein the long term variance information indicates a degree of variance of a signal for each link, according to a predetermined period.

7. A method of controlling power in a decode-and-forward relay system, the method comprising:
    acquiring first channel information of a first link between a source node and a destination node, second channel information of a second link between the source node and a relay node, and third channel information of a third link between the relay node and the destination node, by using a pilot signal, when feedback information is infinite;
    calculating an optimal transmit signal power by using the acquired first through third channel information; and
    transmitting the calculated information of the transmit signal power from the destination node to any one of the source node and the relay node.

8. The method of claim 7, wherein the first through third channel information correspond to a channel gain of the first through third links respectively.

9. The method of claim 8, wherein the calculating comprises:
    calculating $P_s$ by $$P_s = \frac{\gamma_2 P_{st}}{\gamma_1 + \gamma_2 - \gamma_0}$$

where $P_{st}$ indicates an instantaneous power, $\gamma_0$ indicates a channel gain of the first link, $\gamma_1$ indicates a channel gain of the second link, and $\gamma_2$ indicates a channel gain of the third link.

10. An apparatus for controlling power in a decode-and-forward relay system, the apparatus comprising:
    an acquirement unit which acquires first channel, information of a first link between a source node and a destination node, second channel information of a second link between the source node and a relay node, and third channel information of a third link between the relay node and the destination node, by using a pilot signal;
    an identifier which identifies a particular quantization region including the channel information from the acquired first through third channel information; and
    a determination unit which determines information of a transmit signal power corresponding to the particular quantization region,
    wherein the particular quantization region is classified by grouping the first through third channel information into an integer group according to a predetermined criterion.

11. The apparatus of claim 10, wherein the first through third channel information correspond to a channel gain of the first through third links respectively.

12. The apparatus of claim 10, further comprising:
    a transmitter which transmits the determined information of the transmit signal power from the destination node to any one of the source node and the relay node.

13. An apparatus for controlling power in a decode-and-forward relay system, the apparatus comprising:
    an extractor which extracts long term variance information of a first link between a source node and a destination node, long term variance information of a second link between the source node and a relay node, and long term variance information of a third link between the relay node and the destination node when feedback information is absent;
    a calculator which calculates a transmit signal power of the source node by using the extracted long term variance information; and
    a transmitter which transmits a signal at the calculated transmit signal power.

14. The apparatus of claim 13, wherein the calculator calculates $P_s$ by substituting $\kappa$ for $\kappa$ of $P_s = \kappa P$, $\kappa$ being acquired by $$(\lambda_1)^2 \kappa^4 (\kappa - 2) + 2(\lambda_0 + \lambda_1)(\lambda_1 + \lambda_2)(1-\kappa)^2 = 0,$$

where $P_s$ indicates the transmit signal power at the source node, P indicates a total transmit signal power at the source node and the relay node, $\lambda_0$ indicates the long term variance of the first link, $\lambda_1$ indicates the long term variance of the second link, and $\lambda_2$ indicates a long term variance of the third link.

15. The apparatus of claim 13, wherein the long term variance indicates a degree of variance of a signal for each link according to a predetermined period.

16. An apparatus for controlling power in a decode-and-forward relay system, the apparatus comprising:

an acquirement unit which acquires first channel information of a first link between a source node and a destination node, second channel information of a second link between the source node and a relay node, and third channel information of a third link between the relay node and the destination node, by using a pilot signal, when feedback information is infinite;

a calculator which calculates an optimal transmit signal power using the acquired first through third channel information; and a transmitter which transmits the calculated information of the transmit signal power from the destination node to any one of the source node and the relay node.

17. The apparatus of claim 16, wherein the first through third channel information correspond to a channel gain of the first through third links respectively.

18. The apparatus of claim 17, wherein the calculator calculates $P_s$ by $$P_s = \frac{\gamma_2 P_{st}}{\gamma_1 + \gamma_2 - \gamma_0}$$

where $P_{st}$ indicates an instantaneous power, $\gamma_0$ indicates a channel gain of the first link, $\gamma_1$ indicates a channel gain of the second link, and $\gamma_2$ indicates a channel gain of the third link.

* * * * *